Patented July 1, 1941

2,247,822

UNITED STATES PATENT OFFICE 2,247,822

ACIDS OF THE CYCLOPENTANO PHENANTHRENE SERIES AND THEIR DERIVATIVES AND METHOD OF MAKING SAME

Erwin Schwenk, Montclair, N. J., and Bradley Whitman, New York, N. Y., assignors to Schering Corporation, Bloomfield, N. J., a corporation of New Jersey No Drawing. Application June 22, 1936, Serial No. 86,562

26 Claims. (Cl. 260—397.1)

The present invention relates to the production of new compounds having the cyclopentano polyhydro phenanthrene nucleus and more particularly to acids having such structure.

We have found that acid substances whose salts have marked emulsifying and also hemolytic properties and which can be used for the preparation of important new pharmaceuticals of the heart affecting group akin to digitalis or of the female sex hormone series can be obtained by reacting ketocyclopentano polyhydro phenanthrene compounds with acids or their esters, preferably in the presence of a catalyst.

The synthesis of the acid substances, we have found, may be carried out by reactions, which themselves are broadly known, for instance, by the aid of the Reformatsky reaction or the Knoevenagel reaction or modifications of such reactions. The reaction in the first case yields mainly hydroxyacids. However, if $\alpha,\beta$-unsaturated ketones, such as cholestenone or testosterone, are used, the condensation yields directly the unsaturated acids, water being split out during the condensation. If diethyl malonate or succinate or ethyl acetoacetate, ethyl cyanoacetate, ethyl phenylacetate or their free acids, are condensed with these ketones in the presence of bases, such as an alkali metal ethylate or piperidine, the unsaturated esters are directly obtained while if mixed anhydrides, such as malonic and acetic, alkylmalonic and acetic or succinic and acetic anhydrides, are used, the $\beta$-lactones are obtained which on hydrolysis yield the hydroxy acids. From the hydroxy acids water may be split by distilling under high vacuum or by any other usual way. These unsaturated acids are easily reduced by known methods, as by nascent hydrogen, hydrogen in the presence of a hydrogenating catalyst, etc.

The acids or esters with which the keto-compound is reacted are in general characterized by the possession of a reactive-CH-group, the hydrogen atom of such group being labile, and may be monobasic or polybasic. In the case of the monobasic acids, the esters of such acids should be employed, and preferably the alpha-halogeno substitution product thereof, the bromine compound giving generally the best result.

The ketones employed as starting materials may be saturated or unsaturated and the resulting condensation products obtained therefrom may be of the same degree of saturation or of a higher degree of unsaturation.

The reaction in general involves the replacement of the keto group of the ketone employed as the starting material by the residue of an acid, and involves the reaction between such ketone and an organic acid or its ester having a reactive CH group. As examples of the reactive substances that may be employed in our reaction may be mentioned the esters of alpha-bromo acetic acids of the general formula RCHXCOOR' wherein R is H or a radical of aliphatic, aromatic, or aralkyl character, X is a halogen, preferably bromine, and R' is the residue of an alcohol; and also polybasic acids or their esters, including malonic, succinic, etc. or the anhydrides of such acids, or mixtures of acids, anhydrides and esters, preferably with the aid of acid or basic catalytically acting substances. Where the esters are employed, the catalyst may be a methoxide, ethoxide or other alcoholate, piperidine, trimethylamine, sodamide, etc. In a reaction involving the free acid, sulfuric acid and acetic anhydride may be used as the catalyst, or other known catalysts may be utilized. A metal capable of taking part in a Reformatsky type of reaction, such as zinc or magnesium is employed in conjunction with the esters of halogeno-acetic acids. To start the reaction, it is sometimes necessary to add a crystal of iodine or to employ etched zinc (zinc treated with a solution of mercuric chloride). Of course, in place of the keto compounds, other substances may be employed as starting material which can be intermediately converted into ketones.

The invention will be described in greater detail with the aid of the following examples:

Example 1

10 g. of cholestenone are dissolved in 100 cc. of dry benzene, 2 g. of zinc turnings are added and then 3 g. of the ethyl ester of alpha-bromoacetic acid are introduced in the mixture. A small crystal of iodine starts the reaction on the water bath and the mixture is heated for about three hours after the initial reaction has subsided. The reaction mixture is best worked by taking up with ether, washing thoroughly with dilute sulfuric acid, then with water, distilling off the solvents and distilling the residue whereby the unreacted material is separated and the ester of the new acid is obtained. By saponification with alcoholic alkali and subsequent acidification the acid is obtained as white crystals by recrystallization from acetone, with an M. P. of 226°. The spectrum and the analysis prove the substance derived from this Reformatsky type of procedure to be the 2,4-cholestadiene-3-acetic acid. The reactions may be represented as follows:

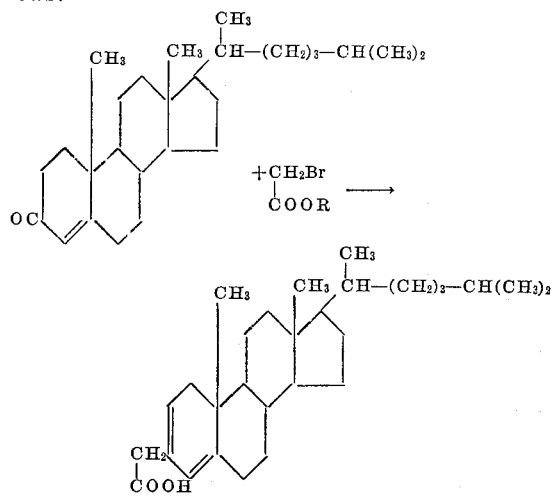

In place of the ethyl ester of alpha-bromoacetic acid, the ester of an alpha-bromophenyl acetic acid may be used.

*Example 2*

10 g. of androsterone are dissolved in 200 cc. of dry benzene, 2 g. of zinc turnings and 5 g. of the ethyl ester of bromoacetic acid are added. To the mixture a small crystal of iodine is added to start the reaction and the mixture is heated on the water bath for 5 hours. The reaction mixure is washed with dilute sulfuric acid, then with water and soda solution, then again with water, and the benzene evaporated off. The residue, which is oily, and crystallizes after prolonged standing, is best taken up with alcoholic alkali and heated gently for 2 hours on the water bath, then diluted with water and put in the ice box. The unreacted starting material crystallizes out and can be filtered. The solution contains the sodium salt of the new acid which is easily salted out after the alcohol is steamed off and an equal volume of saturated sodium chloride solution has been added. The salt which is obtained by filtration is again dissolved by heating it with water and salted out once more. Then it is shaken with ether and hydrochloric acid, whereupon the free acid is obtained in the ethereal solution. The ether is evaporated and the substance recrystallized from acetone by dissolving it in far more than the necessary amount and adding water until the solution becomes turbid. After standing in the ice box, beautiful crystals are formed which show a melting point of 230–232°. The course of the reaction appears to be as follows:

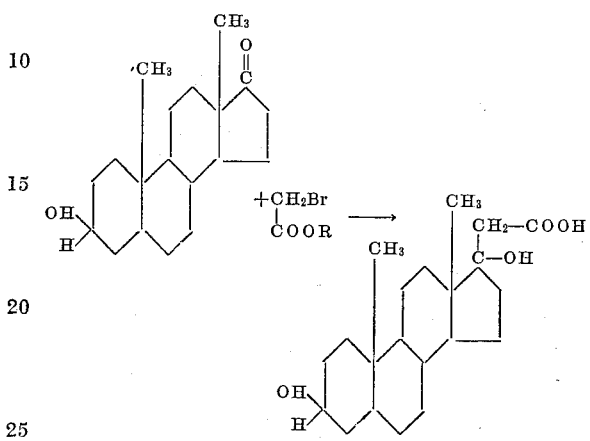

The reaction can also be carried out without addition of benzene but the yields are not as good.

*Example 3*

10 g. of dehydroandrosterone acetate are dissolved in 100 cc. of thoroughly dried dibutyl ether and 3 g. of magnesium metal, as used for Grignard reactions, are added. Then 5 g. of the ethyl ester of alpha-bromopropionic acid are introduced, a small crystal of iodine added and heating started. The mixture is heated for about five hours after the initial reaction has subsided.

The reaction mixture is worked up as in Examples 1 and 2. The acid obtained can be recrystallized from acetone or alcohol and water. The melting point of the substance is 214°. By distilling this acid one molecule of water and $CO_2$ are eliminated and a substance is obtained which melts at 118–122°. This acid by dehydration and hydrogenation yields the so-called Fernholz acid. The condensation reaction appears to take place in the following manner:

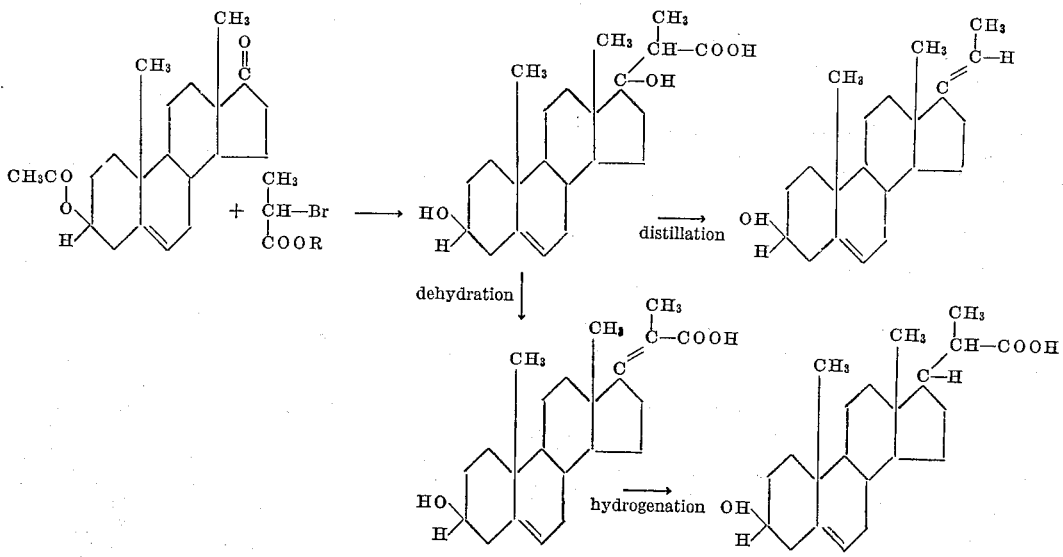

Instead of acetyldehydroandrosterone also the dehydroandrosterone itself can be used.

Example 4

10 g. of isoandrosterone acetate are added to a mixture prepared from 10 g. of malonic acid and 30 g. of acetic anhydride according to the directions of Arthur Michael and Nathan Weiner (Jour. Chem. Soc. April 1936, page 683). Then ether was added and the mixture gently heated whereby the coarse pieces were broken up and after cooling could be filtered by saponifying with a solution of 5 g. KOH in 100 cc. of ethyl alcohol. By cooling, the unreacted androsterone separated and was filtered after 24 hours standing in the ice box. The solution was acidified and the acid which precipitated purified by crystallization. The melting point was 175°. The reaction appears to be the following:

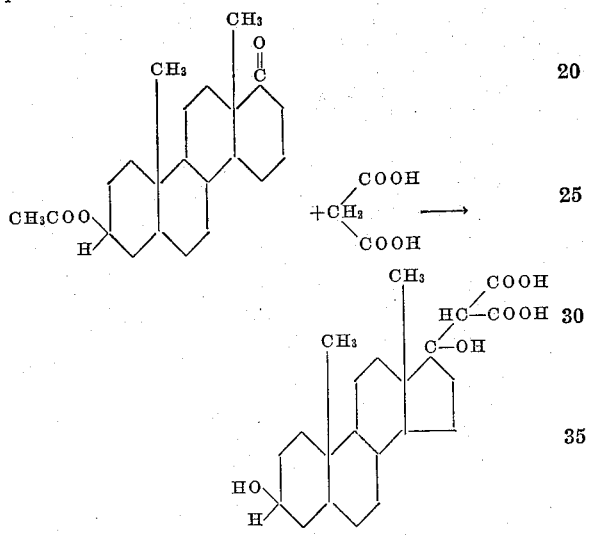

Example 5

10 g. of methyl malonic acid, 30 cc. of acetic anhydride and 0.1 cc. of conc. sulfuric acid were allowed to stand together over night. The excess acetic anhydride and acetic acid were distilled off under vacuum. To the residue 10 g. of dehydroandrosterone acetate were added. The mixture was warmed until a clear solution resulted. After standing for several hours, the material was taken up in 10 cc. of pyridine and 50 cc. of methyl alcohol. 5 g. of semicarbazide hydrochloride were dissolved in 5 cc. of water and this solution added to the above mixture. This was warmed on the water bath and within a few minutes there appeared a precipitate of dehydroandrosterone semicarbazone acetate. The filtrate which contained the condensation product was hydrolyzed with alcoholic KOH. The alcohol was distilled off, the residue taken up in water, acidified and filtered. It was then decarboxylated by heating to 160° in an oil bath. This product was purified by dissolving in alkali and salting out in the manner already described. The substance, melting at 118–122°, was identical with the substance described in Example 3. The following formulas indicate the probable course of the reaction:

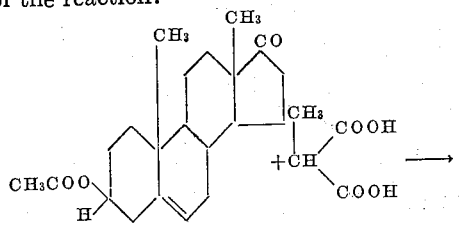

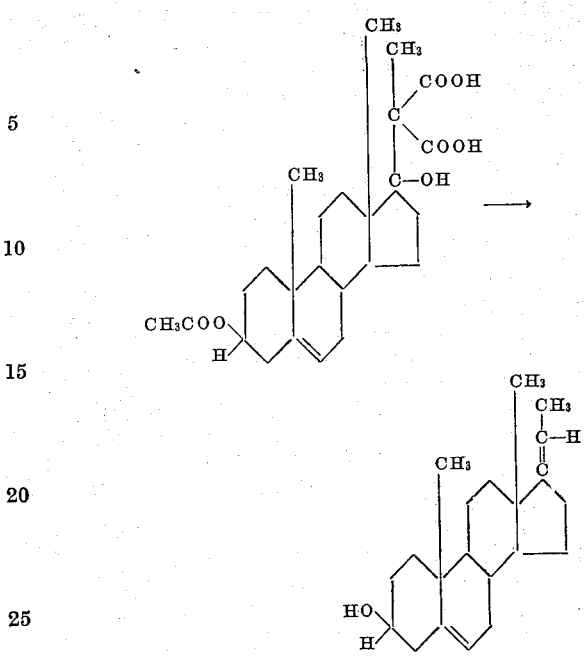

Example 6

10 g. of dehydroandrosterone were dissolved in 20 g. of succinic ester and 5 g. of finely powdered anhydrous sodium ethylate (or of piperidine, sodamide, etc.) were added. The mixture stood for 24 hours and was then dissolved in alcohol and precipitated with water. The oily residue was taken up with ether, thoroughly washed with water, then with acid and again with water, the ether dried and evaporated. The residue was distilled in high vacuum, whereupon the new substance distilled over in a vacuum of about 0.005 mm. of mercury and 150°. The distillate solidified and was recrystallized from acetone. The melting point was 235°. The reaction may be represented as follows:

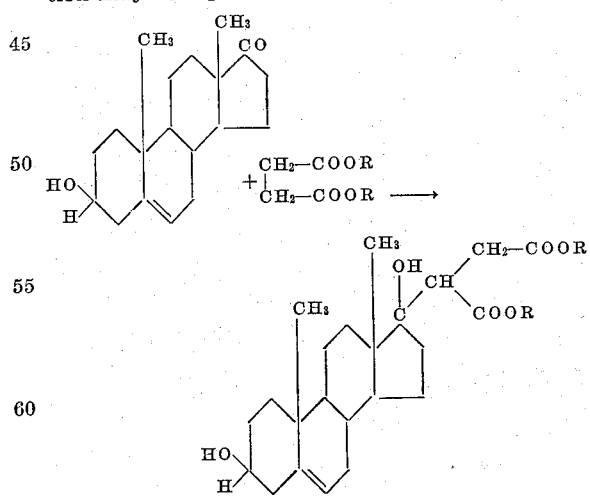

The use of solvents in the above examples may be omitted, but in such case liquid esters (usually methyl and ethyl) are preferably employed.

The above reactions may, of course, be stopped at the salt or ester stage of the new acid, or the salts and esters of the acids may be produced in any known manner from the free acids.

We claim:
1. The method of producing acids of the cyclopentano polyhydro phenanthrene series and their esters, which comprises reacting a cyclopentano- polyhydro phenanthrene compound having a free keto group with a member of the group consisting of organic carboxylic acids and their esters having a reactive CH group.

2. The method of producing acids of the cyclopentano polyhydro phenanthrene series and their esters, which comprises reacting a cyclopentanopolyhydro phenanthrene compound having a free keto group with a member of the group consisting of aliphatic acids and their esters having a reactive CH group.

3. The method of producing acids of the cyclopentano polyhydro phenanthrene series and their esters, which comprises reacting a cyclopentanopolyhydro phenanthrene compound having a free keto group with a compound of the general formula RCHBrCOOR', wherein R is a member of the group consisting of aryl and aralkyl radicals and R' the residue of an alcohol, in the presence of a metal capable of taking part in a Reformatsky type reaction.

4. The method of producing acids of the cyclopentano polyhydro phenanthrene series and their esters, which comprises reacting a cyclopentanopolyhydro phenanthrene compound having a free keto group with a member of the group consisting of organic carboxylic acids and their esters having a reactive CH group, and then dehydrating the product.

5. The method of producing acids of the cyclopentano polyhydro phenanthrene series and their esters, which comprises reacting a cyclopentanopolyhydro phenanthrene compound having a free keto group with a member of the acid having a reactive CH group.

6. The method of producing acids of the cyclopentano polyhydro phenanthrene series and their esters, which includes the step of reacting a cyclopentano polyhydro phenanthrene compound having a free keto group, with a member of the group consisting of dibasic aliphatic acids and their esters containing a reactive CH group.

7. The method of producing acids of the cyclopentano polyhydro phenanthrene series and their esters, which comprises reacting an unsaturated cyclopentanopolyhydro phenanthrene compound having a free keto group with a member of the group consisting of organic carboxylic acids and their esters having a reactive CH group.

8. The method of producing acids of the cyclopentano polyhydro phenanthrene series and their esters, which comprises reacting an unsaturated member of the group consisting of cyclopentano polyhydro phenanthrene compounds having a free keto group, with a member of the group consisting of organic carboxylic acids and their esters having a reactive CH group.

9. The method of producing acids of the cyclopentano polyhydro phenanthrene series and their esters, which comprises reacting a male hormone with a member of the group consisting of organic carboxylic acids and their esters having a reactive CH group.

10. The method of producing acids of the cyclopentano polyhydro phenanthrene series and their esters, which comprises reacting a male hormone with a member of the group consisting of organic carboxylic acids and their esters having a reactive CH group, and eliminating the elements of water from the product.

11. The method of producing acids of the cyclopentano polyhydro phenanthrene series and their esters, which comprises reacting a keto-containing member of the group consisting of unsaturated male hormones and their derivatives in which the hydroxyl group is replaced by a group which with the aid of hydrolysis can in turn be replaced by a hydroxyl group, with a member of the group consisting of organic carboxylic acids and their esters having a reactive CH group.

12. The method of producing acids of the cyclopentano polyhydro phenanthrene series and their esters, which comprises reacting dehydroandrosterone with a member of the group consisting of organic carboxylic acids and their esters having a reactive CH group.

13. The method of producing acids of the cyclopentano polyhydro phenanthrene series and their esters, which comprises reacting an ester of dehydroandrosterone with an acid of the general formula RCHBrCOOR', wherein R is a member of the group consisting of aryl and aralkyl radicals and R' is the residue of an alcohol, in the presence of a metal capable of forming alkyl compounds, and heating the reaction product until the condensate is dehydrated.

14. The method according to claim 13 wherein the acid is alpha-bromopropionic.

15. The product of the condensation of a cyclopentano polyhydro phenanthrene compound having a free keto group with a member of the group consisting of organic carboxylic acids and their esters containing a reactive CH group.

16. The product of the condensation of a cyclopentano polyhydro phenanthrene compound having a free keto group and an ester of the general formula RCHXCOOR' wherein R is a member of the group consisting of aryl and aralkyl radicals, X is halogen and R' is the residue of an alcohol.

17. The product of the condensation of a cyclopentano polyhydro phenanthrene compound having a free keto group with a member of the group consisting of dibasic aliphatic acids and their esters containing a reactive CH group.

18. The dehydrated reaction product of a cyclopentano polyhydro phenanthrene compound having a free keto group with a member of the group consisting of organic carboxylic acids and their esters containing a reactive CH group.

19. An unsaturated acid of the cyclopentano dimethyl polyhydro phenanthrene series having a composition corresponding to the following structural formula:

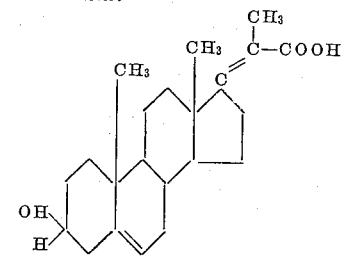

20. An unsaturated acid having the cyclopentano phenanthrene nucleus and having a composition corresponding to the following structural formula:

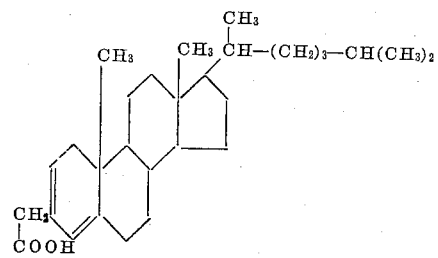

21. In a process for producing acids having the cyclopentano polyhydro phenanthrene nucleus, and their neutralization products, the steps which comprise reacting dehydroandrosterone wherein the 3 position is occupied by a member of the group consisting of the hydroxyl group and groups which with the aid of hydrolysis can be replaced by the hydroxyl group, with an ester of an alpha-halogeno aliphatic acid, dehydrating the product, to produce a double bond at the 17-position with elimination of the 17-hydroxyl group, and hydrogenating the material to saturate such double bond.

22. In a process for producing acids having the cyclopentano polyhydro phenanthrene nucleus, and their neutralization products, the steps which comprise reacting dehydroandrosterone wherein the 3 position is occupied by a member of the group consisting of the hydroxyl group and groups which with the aid of hydrolysis can be replaced by the hydroxyl group, with an ester of an alpha-halogeno propionic acid, dehydrating the product, to produce a double bond at the 17-position with elimination of the 17-hydroxyl group, and hydrogenating the material to saturate such double bond.

23. In a process for producing acids having the cyclopentano-10,13-dimethyl-polyhydro phenanthrene nucleus, the step which comprises reacting dehydroandrosterone with an ester of alpha-halogeno propionic acid.

24. Cyclopentanopolyhydro phenanthrene acids and esters in which one of the 3 and 17-nuclear carbons is attached by a double bond to the side chain carbon carrying the carboxylic group.

25. The method of producing acids of the cyclopentanopolyhydro phenanthrene series and their esters, which comprises reacting a cyclopentanopolyhydro phenanthrene compound having a free keto group, with an ester of an organic carboxylic acid having a reactive CH group with the aid of a basic organic catalyst capable of effecting combination of the ester with the keto group.

26. The method of producing acids of the cyclopentanopolyhydro phenanthrene series and their esters, which comprises reacting a cyclopentanopolyhydro phenanthrene compound having a free keto group, with a mixed organic anhydride of an aliphatic mono-carboxylic acid and a dicarboxylic acid containing a reactive CH group.

ERWIN SCHWENK.
BRADLEY WHITMAN.